United States Patent [19]

Crea et al.

[11] Patent Number: 4,462,973

[45] Date of Patent: Jul. 31, 1984

[54] PHOSPHORUS PURIFICATION

[75] Inventors: David A. Crea; Jerry A. Keely, both of Pocatello, Id.

[73] Assignee: FMC Corporation, Philadelphia, Pa.

[21] Appl. No.: 508,211

[22] Filed: Jun. 27, 1983

[51] Int. Cl.³ .................... C01B 25/01; C01B 25/02; C01B 25/04
[52] U.S. Cl. ...................................... 423/322; 423/323
[58] Field of Search .............................. 423/322, 323

[56] References Cited

U.S. PATENT DOCUMENTS

| 2,039,297 | 5/1936 | Curtis | 23/223 |
|---|---|---|---|
| 2,050,796 | 8/1936 | Kerschbaum et al. | 23/223 |
| 2,123,554 | 7/1938 | Klosky | 23/223 |
| 2,537,078 | 1/1951 | Miller | 423/322 |
| 2,636,811 | 4/1953 | Nordblom | 423/322 |
| 2,689,019 | 9/1954 | Roberts et al. | 183/7 |
| 2,796,333 | 6/1957 | Wade | 23/223 |
| 3,104,952 | 9/1963 | Hartig | 423/322 |
| 3,444,668 | 5/1969 | Masuda | 55/118 |
| 3,673,768 | 7/1972 | Leonard | 55/135 |
| 3,830,039 | 8/1974 | Ebert et al. | 55/5 |

Primary Examiner—Gregory A. Heller
Attorney, Agent, or Firm—Frank Ianno; Eugene G. Seems

[57] ABSTRACT

Liquid phosphorus as produced by the reduction of a phosphate ore in an electric arc furnace while of high purity contains color-causing impurities that impart to the phosphorus a black color by reflected light. Such liquid phosphorus is polished or refined to exhibit a yellow or yellow brown cast by mixing it with hot water and subjecting the mixture to intense agitation. The refined phosphorus is separated from the water phase which retains the impurities.

17 Claims, 1 Drawing Figure

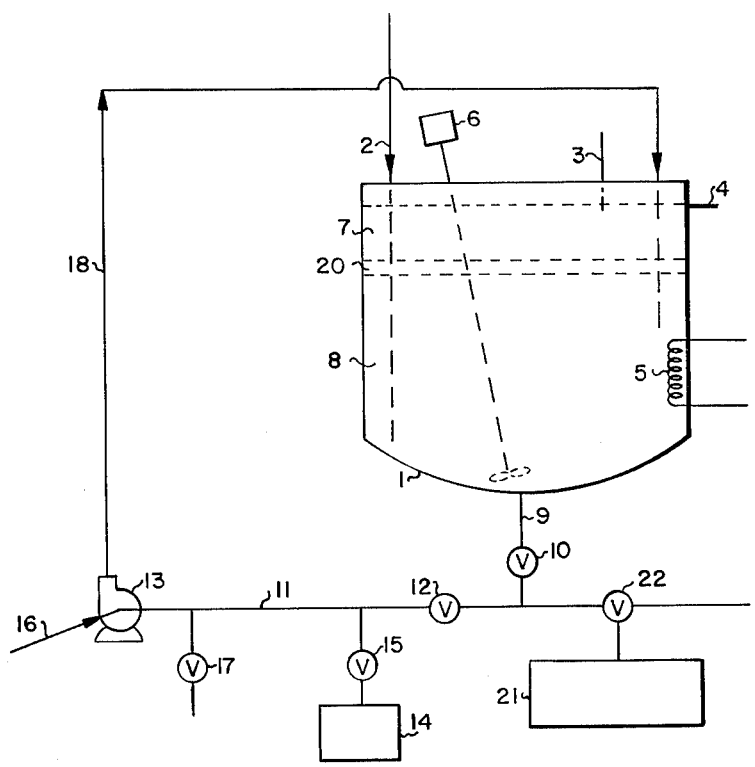

PHOSPHORUS PURIFICATION

This invention relates to a method for the polishing or refining of elemental phosphorus.

Elemental phosphorus is produced commercially in an electric arc furnace by the thermal reduction of phosphate ore in the presence of a reducing agent such as coke and a flux such as silica. This method of production yields a hot gaseous mixture consisting primarily of phosphorus vapors and carbon monoxide with minor amounts of phosphorus oxides, silicon tetrafluoride, hydrogen fluoride, volatilized organic compounds and entrained solid particles originating in the furnace charge and two solid products, a calcium silicate slag and ferrophosphorus.

The gaseous mixture is passed through an electrostatic precipitator wherein the major portion of the entrained solid particles is removed. The gaseous mixture is then introduced into one or more spray condensers wherein sufficient water is introduced by overhead spray heads so as to reduce the temperature of the gas below the dew point but above the freezing point of phosphorus. The phosphorus vapor condenses into liquid globules which fall to the base of the condensers. The gas also contains particulate solids not removed in the electrostatic precipitator and some of these solids will be entrained with the condensed phosphorus and the water and fall to the base of the condensers. The phosphorus globules, particulate solids and water pass into a sump forming a suspension. The suspension is allowed to stratify into a lower layer of liquid phosphorus formed by the coalescence of the phosphorus globules, an upper layer of water and an intermediate layer generally referred to as sludge.

Although the liquid phosphorus is of high purity, generally at least about 99.7% phosphorus, it exhibits a black color by reflected light rather than a yellow or brownish-yellow color as might be expected from its purity. The precise nature and composition of the color-causing impurities is not known. Where the phosphorus is intended for burning to produce phosphoric acid, the presence of sufficient color-causing impurities to render the phosphorus black is of no consequence. However, where the phosphorus is to be used as a reactant in the production of such compounds as phosphorus trichloride and phosphorus pentasulfide the presence of the color-causing impurities is detrimental.

Some of the color-causing impurities are insoluble in benzene and may be termed "dirt," originating either as dust in the furnace charge or condensed sublimates driven from the furnace reaction zone. Other of the color-causing impurities appear to be organic in nature and are soluble in benzene. Thus, the benzene-insoluble content of the phosphorus does not necessarily correlate with a visual or photographic inspection of the phosphorus. Similarly, the clarity of phosphorus as measured by the transmission of light (at 520 nm—the maximum transmittance frequency for phosphorus) through a thin section of phosphorus does not correlate with a visual inspection. Some of the color-causing impurities may be yellow or orange in color being introduced by the process or formed by exposure of the phosphorus samples to light during handling. Although some of the impurities are such as to impart a color by reflected light, they may not affect light transmission through a thin film or section. There is no correlation between the benzene-insoluble content and the transmission of light through a thin film of the phosphorus.

In conventional practice, where extremely pure yellow phosphorus is required, the phosphorus upon its withdrawal from the sump is subjected to pressure filtration so as to remove color-causing impurities and produce a yellow phosphorus product.

The present invention provides a method for polishing or refining phosphorus from liquid phosphorus existing as a continuous phase and containing dispersed therein sufficient color-causing impurities so as to impart to the phosphorus a black color by reflected light. The method eliminates the disadvantages and problems associated with pressure filtration. The terms "polishing" and "refining" are used to designate a removal of sufficient color-causing impurities so that the processed phosphorus exhibits a yellow or brownish-yellow color by reflected light.

In accordance with the present method, a portion of liquid phosphorus containing color-causing impurities is withdrawn from a body of the phosphorus, mixed with hot water in a volume ratio of liquid phosphorus to water of at least about 2:1 and the mixture subjected to vigorous agitation. The volume ratio may vary up to as high as 100:1, but is preferably about 40:1. The mixture may be formed in a suitable pump which withdraws the phosphorus from a suitable supply. The water may be supplied by injecting it into the line through which the phosphorus is being drawn into the pump or may be injected into the pump. The mixture is subjected to intense agitation so as to effect a migration or transfer of color-causing impurities from the phosphorus to the phosphorus-water interface. Preferably, the agitation is attained in a turbulent flow of the mixture by forcing the mixture through a restricted path such as a pipeline to achieve a Reynolds number of at least about 50,000, preferably at least about 140,000. The mixture is subjected to such agitation in a restricted path and is then discharged into the remaining body of phosphorus. During the mixing and agitation, color-causing impurities are transferred or migrate from the phosphorus to the phosphorus-water interface. The discharged mixture stratifies whereby the phosphorus commingles and coalesces with the body of the liquid phosphorus to form a body of liquid phosphorus containing a lower proportion of color-causing impurities. The water with color-causing impurities rises to the surface of the phosphorus to form a water-sludge layer. The withdrawal of phosphorus, mixing and agitation of the phosphorus-water mixture and discharging of the mixture is continued until the withdrawn phosphorus exhibits a yellow or brownish-yellow color followed by separating the polished or refined phosphorus. In the processing operations, the temperature is maintained above the melting point of phosphorus, preferably between about 55° C. and 65° C.

The method of this invention is most satisfactory for polishing so-called "clean" phosphorus, which is that formed by the normal phosphorus production process and exists in a continuous phase and has a purity of at least about 99%, typically being at least about 99.7% phosphorus. Phosphorus of this purity can be identified by a smooth waxy surface, light is visible through thin sections and the sample should have a slight yellow cast to the basic light black color.

The method of this invention can also be used to polish "dirty" phosphorus, which is typically produced by centrifuging sludge. "Dirty" phosphorus is characterized by a continuous phosphorus phase but less waxy, rougher surface and has a black color, even in thin sections. The black-colored contaminants are proportionately harder to remove from this material and produce more by-product sludge.

The method of this invention is not suitable for polishing sludge, in which phosphorus is the dispersed phase.

The drawing is a diagrammatic illustration of apparatus suitable for the practice of the method.

A closed tank 1 is adapted to receive liquid phosphorus through a conduit 2 positioned along the wall of the tank. Water is supplied through a line 3. As is conventional in the handling and processing of phosphorus, the tank is first provided with water to a desired depth. As the phosphorus is supplied to the tank, water is displaced and excess water is discharged through a port 4 adjacent to the top of the tank. A sufficient depth of water is maintained so as to prevent the phosphorus and the sludge formed during processing from coming in contact with air. A steam coil 5 may be mounted within the tank and is adapted to supply sufficient heat to maintain the phosphorus in liquid state. Alternatively, the tank may be provided with an external steam jacket. A mixer 6 may be provided so as to mix continuously the phosphorus as it is withdrawn from the bottom of the tank for processing, but is not necessary at least in relatively small tanks which are agitated by the incoming fluid flow. The phosphorus level may be determined by a suitably weighted float or an electric probe means which are not shown.

In operation, a suitable amount of water is supplied to the tank through line 3 to provide a water layer 7. The desired amount of phosphorus is supplied through line 2 to provide a phosphorus layer 8. Phosphorus is drawn from the bottom of tank 1 through line 9, valve 10, line 11 and valve 12 by a suitable centrifugal pump 13. A sampling container 14 is provided adapted to allow withdrawal of samples of the processed phosphorus from time to time from line 11 through valved line 15. The pump 13 is provided with a water seal to which hot water is supplied by line 16. Additional hot water, if desired, is supplied to line 11 through a regulator valve 17. The phosphorus and water are mixed in the pump and forced through line 18 back to the tank 1. As the phosphorus-water mixture is forced through line 18, the phosphorus and water are mixed intensely and intimately due to the turbulence in the path. During the turbulent flow, color-causing impurities are attracted to the phosphorus-water interface or to the water. The agitated mixture is discharged from line 18 into the phosphorus layer 8. The discharged phosphorus coalesces with the liquid phosphorus. The water rises to the surface of the phosphorus layer, taking with it undesirable color-causing impurities. It stratifies into a water layer 7 and a sludge layer 20. Excess water is discharged through port 4.

The amount and character of the sludge produced varies with the amount and character of the foreign substances in the phosphorus. Obviously, the amount of sludge varies directly with the amount of foreign substances in the phosphorus. For example, in polishing about 220 gallons (832.8 L) of a high purity phosphorus containing about 0.1% benzene insolubles (BI), a sludge layer of a thickness of 0.25–0.50 inch (0.63–1.27 cm) is produced. The sludge has the appearance of a dirty, filmy phosphorus with black particles dispersed therein. In the case of phosphorus containing higher proportions of foreign substances such as 0.3% BI, a 3 inch (7.6 cm) sludge layer will be formed. With phosphorus containing appreciably higher contents of benzene insolubles, the sludge layer may vary to a thickness of 12 inches (30.5 cm) or more. The very thick sludge layer is black, stiff and spongy in nature and when picked up in a small container such as a beaker, it will not flow to deform to the beaker. The mass appears to be formed of polymeric phosphorus shells and dirt. The globular sacs of phosphorus found in normal sludge are not predominant. By analysis, this sludge contained 2.8% carbon indicating that the "dirt" may be coke dust originating in the furnace burden and/or some other carbonaceous substances.

The method is preferably practiced in a cyclic manner. A desired quantity of phosphorus is supplied to tank 1 and a mixture of phosphorus and the desired amount of water circulated by pump 13. Samples of the phosphorus are withdrawn periodically through line 15 and delivered to sample container 14. When visual inspection of the sample illustrates that the phosphorus has been refined to the desired extent, circulation of the phosphorus-water mixture is arrested, valve 12 is closed and the major portion of the refined phosphorus withdrawn to a suitable tank 21 through line 22. Another batch of phosphorus is then supplied to tank 1 through line 2 and the cycle repeated. Periodically, based upon experience, the sludge layer 21 may be removed by supplying sufficient phosphorus to tank 1 so as to displace the water and sludge which is discharged through port 4. Alternatively, the phosphorus may be drained from the tank followed by draining the sludge and water prior to introducing another batch of phosphorus to the tank for processing. The sludge is combined with other plant sludge for subsequent processing.

An alternate method of practicing the treatment would be to use two tanks, filling one with phosphorus, then intensely contacting the phosphorus with water as it is transferred to another tank. In this approach, the treated phosphorus would not re-mix with the untreated feed. The cleanup process may then proceed faster, although more tankage is required.

Yet another alternate method would involve contacting the water and phosphorus by intense agitation induced by an agitator mounted on a vessel, as in a typical stirred-tank reactor, and separating the refined phosphorus from the impurities held with the aqueous phase.

For laboratory demonstrations, a tank was provided having a diameter of 4 ft. (1.22 m) and a depth of 4 ft. (1.22 m). The pipeline between the discharge of the pump and the tank had a diameter of 1.5 in. (3.81 cm). The vertical rise of the pipe from the pump was 8 ft. (2.44 m), the horizontal run of the pipe was 12 ft. (3.66 m) and the vertical length of the pipe to its discharge end was 6 ft. (1.83 m) for a total pipe length of 26 ft. (7.93 m). The pump was a Durco Mark II centrifugal pump with a 1.5 in. (3.8 cm) inlet, a 1 in. (2.5 cm) outlet and fitted with a 5.5 in. (13.97 cm) diameter impeller.

In the examples which follow, about 220 gallons (832.7 L) of phosphorus samples were supplied to the tank under about a 17 in. (43 cm) layer of water, the phosphorus and water being maintained at about 60° C. During processing of all samples, 0.5 gpm, (1.9 Lpm) of hot water was supplied to the water seal of the pump. Where indicated, additional hot water was supplied to line 11 through regulator valve 17. In one series of examples, the pump was operated at 3450 RPM [impeller edge velocity 4968 ft./min. (1514 m/min.)] and in another series, at 1750 RPM [impeller edge velocity 2520 ft./min. (768 m/min.)]. The Reynolds numbers were calculated for the different velocities at which the phosphorus-water mixtures were passed through the pipeline.

The types of feed samples and their properties are noted in Table I. All samples exhibited a black color by reflected light. The benzene-insoluble content and percent transmission at 520 nm were determined. The light transmittance was determined by the use of a Bausch and Lomb Spectronic 100 Spectrophotometer at 520 nm, the maximum transmittance frequency for liquid phosphorus. The instrument is calibrated to show a 100% transmittance with an empty silica cell having walls spaced apart so as to provide a 1 mm path through the sample for the light beam. The samples were introduced into and removed from the cell by the use of hypodermic syringes. The cells were cleaned between uses with nitric acid. The data indicate clearly that there is no direct correlation between the benzene-insoluble content and the light transmittance. Similarly, there is no correlation between the color by reflected light and the benzene-insoluble content and light transmittance.

The conditions of processing are shown in Table II. In the processing of Runs 1–4, the pump was operated at 3450 RPM while for Runs 5–8, the pump was operated at 1750 RPM. The phosphorus pumping rate was not determined in Run 4, hence the Reynolds number, velocity of flow and pipeline residence time also were not determinable. It will be noted that in Runs 1, 5 and 6, the only water mixed with the phosphorus during processing was that which was added through the pump seal. In Runs 2, 3, 7 and 8, additional water was supplied to line 11 through valve 17. In Run 4, the run was begun with only water supplied to the pump seal but additional water was gradually increased to 5.5 gpm during the latter part of the processing. As shown by Table II, the ratio of the volume of phosphorus to the volume of water varied from 1.1:1 to 84.4:1. The Reynolds numbers were calculated based upon flow rate of the combined mixture using the viscosity of phosphorus.

The properties of the processed phosphorus are shown in Table III. The transmittance was determined as described. The color determination for Run 5 was determined by visual inspection. The determinations for Runs 1, 2, 3, 4, 6, 7 and 8 were based upon the Pantone Matching System (Pantone, Inc., Moonachie, N.J.) of colors on coated paper, Pantone 139 being used as the standard.

The test data shows that a high level of mixing as measured by pipeline Reynolds number is desirable to quickly and surely separate the impurities. In Runs 1, 2 and 3, clean yellow phosphorus was produced in 18 to 24 minutes, whereas in Runs 6 and 7 the processing time was much longer and the products produced did not exhibit the bright color of the runs at more intense contacting conditions.

Run 4 demonstrated that the method is also satisfactory to clean up very dirty phosphorus by extending the processing time at proper conditions. Comparison of Run 8 with Run 4 indicates that the more turbulent processing conditions will remove more dirt, as measured by benzene-insolubles content, in similar processing times. The material of Run 5 produced a black product, quite clean compared to the starting material, which would likely have taken on a yellow color had the processing time been extended.

The products of all Runs except 4 and 5 exhibit yellow colors with benzene-insoluble content of 0.00% to 0.11% and all would be considered very acceptable. The product of Run 4 exhibits high benzene-insolubles together with high transmittance and a yellow color, while the product of Run 5 exhibits a black color with low benzene insoluble content and high transmittance. This data illustrates that neither the benzene-insoluble content nor the light transmittance bear a direct relationship with the color of the processed phosphorus. As an approximation, however, when processed to a benzene-insoluble content of not more than about 0.10% and to a light transmittance of at least about 65%, the phosphorus will be refined to a bright yellowish color and will be a very satisfactory product.

The method comprises mixing the phosphorus to be refined with water and maintaining the mixture under sufficient agitation, preferably turbulence, so as to allow color-causing impurities in the phosphorus to migrate to the water and be removed with the water when the phases separate under quiescent conditions. The amount of water used may be such as to provide a volume ratio of phosphorus to water as low as about 2:1 to as high as about 100:1. For general plant operations, a ratio of about 40:1 is preferred. The agitation may be effected by mixing the water and phosphorus in a pump and agitation preferably continued by passing the phosphorus-water mixture through a pipeline under such conditions to achieve a Reynolds number of at least about 50,000, preferably at least about 140,000. The mass is maintained in an agitated state, preferably in a turbulent state, so as to effect the required transfer of color-causing impurities to the phosphorus-water interface. In general, and for practical operating purposes, the greater the degree of agitation or turbulence, the shorter the required processing period.

TABLE I

| | Feed All Samples Black | | |
|---|---|---|---|
| Run No. | Sample | % BI | Transmittance at 520 nm % |
| 1 | "Clean" $P_4$ | 0.10 | 40.8 |
| 2 | "Clean" $P_4$ | 0.11 | 64.0 |
| 3 | "Clean" $P_4$ | 0.04 | 70.1 |
| 4 | "Dirty" $P_4$ | 2.70 | 0 |
| 5 | "Dirty" $P_4$ | 0.96 | 27.9 |
| 6 | "Clean" $P_4$ | 0.04 | 67.8 |
| 7 | "Clean" $P_4$ | 0.04 | Lost Sample |
| 8 | "Dirty" $P_4$ | 0.55 | 2.5 |

TABLE II

| | Processing Conditions | | | | |
|---|---|---|---|---|---|
| Run No. | Vol/Vol $P_4/H_2O$ gpm | Reynolds No. × 1000 | Velocity Ft/Sec. | Pipeline Residence Time Sec. | Time Min. |
| 1 | 42.2/0.5 (84.4) | 175 | 7.7 | 3.4 | 24 |
| 2 | 36/5.5 (6.55) | 170 | 7.5 | 3.5 | 22 |
| 3 | 25/10.5 (2.38) | 145 | 6.4 | 4.1 | 18 |
| 4 | */0.5–5.5 | * | * | * | 186 |
| 5 | 21.5/0.5 (43) | 91 | 4.0 | 6.5 | 80 |
| 6 | 19.5/0.5 (39) | 82 | 3.6 | 7.2 | 90 |
| 7 | 6.5/6.1 (1.1) | 52 | 2.3 | 11.3 | 50 |
| 8 | 15.6/2.5 | 66 | 2.9 | 9.0 | 240 |

TABLE II-continued

| | Processing Conditions | | | | |
|---|---|---|---|---|---|
| Run No. | Vol/Vol P₄/H₂O gpm | Reynolds No. × 1000 | Velocity Ft/Sec. | Pipeline Residence Time Sec. | Time Min. |
| | (31.2) | | | | |

*Not Determinable
NOTE: Figures in parentheses represent volume of liquid phosphorous to unit volume of water.

TABLE III

| | Product | | |
|---|---|---|---|
| Run No. | % BI | Transmittance at 520 nm % | Color |
| 1 | 0.09 | 66.7 | Pantone 139 |
| 2 | 0.05 | 65.6 | Pantone 139 |
| 3 | 0.04 | 68.8 | Pantone 139 |
| 4 | 0.61 | 72.2 | Yellow Brown Cast |
| 5 | 0.08 | 47.1 | Black |
| 6 | 0.02 | Lost Sample | Pale Dirty Yellow |
| 7 | 0.00 | 61.2 | Yellow Brown Cast |
| 8 | 0.11 | 35.7 | Yellow Brown Cast |

What is claimed is:

1. A method for refining yellow phosphorus existing as a mass of liquid yellow phosphorus in a continuous phase and containing sufficient color-causing impurities to impart to the phosphorus a black color by reflected light which comprises forming an intimate mixture of at least a portion of the mass with water to provide a volume ratio of the portion of the mass to water of from about 2:1 to about 100:1, subjecting the mixture to intense agitation whereby impurities migrate from the phosphorus to the phosphorus-water interface and thereafter separating refined yellow phosphorus from the aqueous phase containing the impurities.

2. The method according to claim 1 wherein the portion of the mass mixed with water is such as to provide a volume ratio of the mass to water of about 40:1.

3. The method according to claim 1 wherein the intense agitation is effected by passing the mixture through a restricted passage under conditions to create a turbulent flow of the mixture.

4. The method according to claim 1 wherein the intense agitation is effected by passing the mixture through a restricted passage under conditions whereby the mixture attains a Reynolds number of at least about 50,000.

5. The method according to claim 1 wherein the intense agitation is effected by passing the mixture through a pipeline under conditions whereby the mixture attains a Reynolds number of at least about 140,000.

6. A cyclic method for refining yellow phosphorus existing as a mass of liquid yellow phosphorus in a continuous phase and containing sufficient color-causing impurities to impart to the phosphorus a black color by reflected light which comprises forming an intimate mixture of a portion of the mass and water to provide a volume ratio of the portion of the mass to water of from about 2:1 to about 100:1, agitating intensely the mixture to effect a migration of color-causing impurities from the phosphorus to the phosphorus-water interface, adding the agitated mixture to the remainder of the mass to form a mass of liquid yellow phosphorus containing a lower proportion of color-causing impurities, repeating the cycle until sufficient color-causing impurities have been removed from the mass to impart to the liquid yellow phosphorus a yellow brown cast and separating refined yellow phosphorus from the aqueous phase containing the impurities.

7. The method according to claim 6 wherein the portion of the mass mixed with water is such so as to provide a volume ratio of phosphorus to water of about 40:1.

8. The method according to claim 6 wherein the mixture is agitated intensely by passing it through a restricted passage under conditions to create a turbulent flow of the mixture.

9. The method according to claim 6 wherein the mixture agitated intensely by passing it through a restricted passage under conditions whereby the mixture attains a Reynolds number of at least about 50,000.

10. The method according to claim 6 wherein the mixture is agitated intensely by passing it through a pipeline under conditions whereby the mixture attains a Reynolds number of at least about 140,000.

11. The method according to claim 6 wherein the cycles of treatment are repeated until the liquid yellow phosphorus has a color corresponding to Pantone Color 139.

12. A cyclic method for refining yellow phosphorus existing as a mass of liquid yellow phosphorus in a continuous phase and containing sufficient color-causing impurities to impart to the phosphorus a black color by reflected light which comprises the steps of continuously withdrawing a portion of the mass, mixing intensely the withdrawn portion with water in a volume ratio of liquid yellow phosphorus to water of from about 2:1 to about 100:1, subjecting the mixture to intense agitation so as to effect a migration of color-causing impurities from the phosphorus to the phosphorus-water interface, discharging the agitated mixture into the remainder of the mass, allowing the discharged mixture to stratify whereby the liquid phosphorus of the mixture commingles and coalesces with the remainder of the liquid phosphorus of the mass to form a mass of liquid phosphorus containing a lower proportion of color-causing impurities, continuing the cycle of steps until the withdrawn portion of the phosphorus exhibits a yellow brown cast and separating the refined liquid yellow phosphorus from the aqueous phase containing the impurities.

13. The method according to claim 12 wherein intense agitation of the mixture is effected by passing the mixture through a restricted passage under conditions creating a turbulent flow of the mixture.

14. The method according to claim 12 wherein the conditions under which the mixture is passed through the restricted passage are such that the mixture attains a Reynolds number of at least about 50,000.

15. The method according to claim 12 wherein the mixture is passed through a pipeline under conditions whereby the mixture attains a Reynolds number of at least 50,000.

16. The method according to claim 12 wherein a portion of the mass is mixed with water in a volume ratio of about 40:1 and the mixture is passed through a pipeline under conditions whereby the mixture attains a Reynolds number of at least about 140,000.

17. The method according to claim 12 wherein a portion of the mass is mixed with water in a volume ratio of about 40:1, the mixture is passed through a pipeline under conditions whereby the mixture attains a Reynolds number of at least about 140,000 and the cycles of steps are continued until the phosphorus exhibits a color corresponding to Pantone Color 139.

* * * * *